United States Patent [19]
Takahashi et al.

[11] 3,890,118
[45] June 17, 1975

[54] METHOD OF GRINDING GEARS

[75] Inventors: Koichi Takahashi, Yokohama; Nobuteru Hitomi, Yokosuka, both of Japan

[73] Assignee: Nissan Motor Company Limited, Yokohama, Japan

[22] Filed: Oct. 18, 1973

[21] Appl. No.: 407,606

[30] Foreign Application Priority Data
Oct. 19, 1972 Japan.............................. 47-104016

[52] U.S. Cl. ................................. 51/287
[51] Int. Cl. ............................... B24b 1/00
[58] Field of Search ..................... 51/287

[56] References Cited
UNITED STATES PATENTS
1,815,336  7/1931  Shlesinger................... 51/287 X
2,711,621  6/1955  Hjelmblad................... 51/287
2,910,808  11/1959  Wildhaber................... 51/287 X
3,127,709  4/1964  Waguri....................... 51/287 X
3,213,567  10/1965  King............................ 51/287 X

*Primary Examiner*—Donald G. Kelly

[57] ABSTRACT

Concave and convex side tooth surfaces of longitudinally curved gear teeth are separately ground by relatively small and large dished grinding wheels inclined at acute angles to planes tangent to the pitch surfaces of the teeth being ground. Indexing operations are performed to allow the maximum radii of the small and large wheels to be as respectively small and large as possible and still allow clearance between the wheels and adjacent tooth surfaces.

8 Claims, 20 Drawing Figures

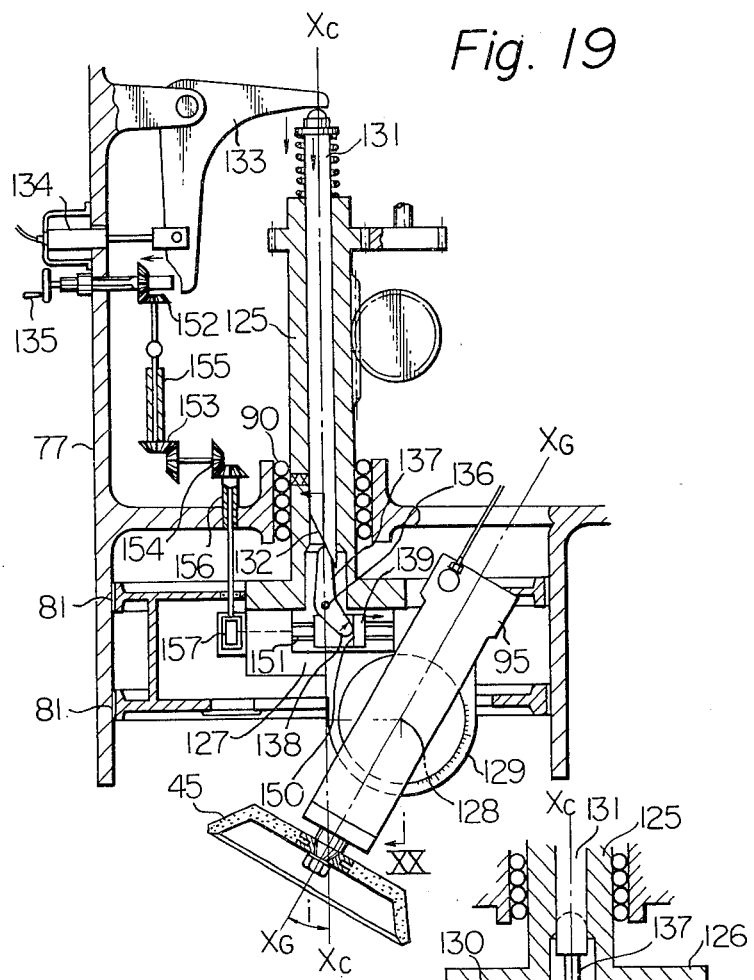

METHOD OF GRINDING GEARS

The invention relates to a method of grinding the side tooth surfaces of preliminarily formed longitudinally curved teeth of gears such as spiral bevel and hypoid gears.

Prior art methods of grinding the tooth surfaces of such gears generally involve the use of a rotary truncated cone or dish shaped grinding wheel. A single wheel is inclined at an angle to the pitch surface of the tooth to be ground, inserted into the tooth space, and simultaneously rotated about its axis and moved in a longitudinally curved path across the face of the gear. These methods usually simultaneously grind a concave and an adjacent convex side tooth surface in a "spread blade" configuration, in which the profile of the grinding wheel is dressed to the form of the milling or generating cutter which originally machined the gear teeth. The major disadvantage of this type of method is that the maximum radii of the surfaces of the wheel grinding the concave and convex tooth surfaces of the teeth are respectively too large and too small, and problems of glazing, burning, or scoring of the teeth surfaces and overloading of the grinding wheel are frequently encountered.

It is therefore an object of the invention to provide a method of grinding longitudinally curved tooth gears which is clean and efficient and overcomes the problems of the prior art.

It is another object of the invention to provide a method of grinding longitudinally curved tooth gears using separate dished grinding wheels to grind concave and convex side tooth surfaces in which the maximum radii of the grinding wheels for grinding the concave and convex surfaces are respectively as small and large as possible.

It is still another object of the invention to provide a method of grinding longitudinally curved tooth gears in which sufficient clearance between the grinding wheels and adjacent tooth surfaces is provided during indexing operations.

These and other objects will become clearer from the following description and the accompanying drawings, in which:

FIG. 19 shows a locating mechanism to displace the grinding wheel along a basic axis and angularly with respect to its own axis; and FIG. 20 is a partial sectional view on a line XX—XX of FIG. 19.

Figure 1:
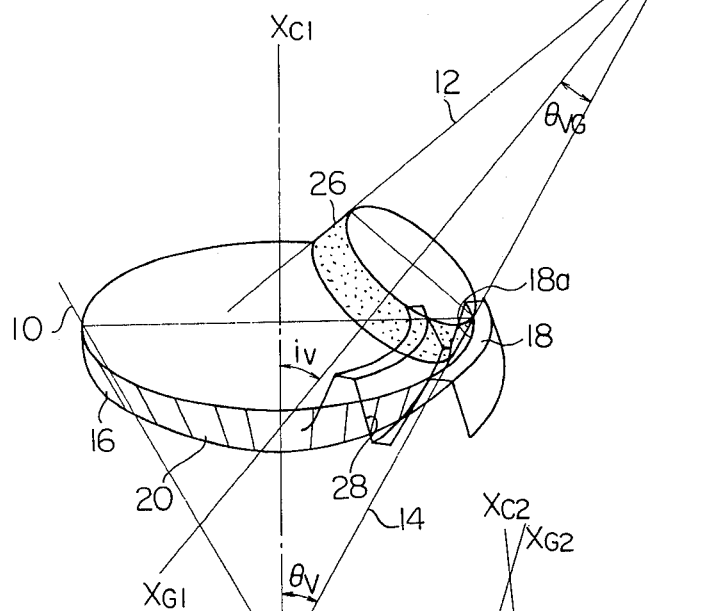
FIG. 1 is a graphical view of the geometry of a dished grinding wheel grinding a concave side surface of a gear tooth in accordance with the method of the invention in relation to a milling cutter which preliminarily machined the gear.

Referring now to FIG. 1, there is shown a cone 10 of revolution which is generated by a series of blades 16 on one face of an annular face milling cutter 20 shown in phantom, and an axis of revolution $XC_1$—$XC_1$ which is a basic axis perpendicular to the pitch surface of a tooth 18 of a gear being ground. A second cone 12 defining a small grinding wheel 26 has a common line 14 colinear with the cone 10 and an axis $XG_1$—$XG_1$.

In this figure, a concave gear tooth side surface 18a of a spiral bevel gear is being ground by the grinding wheel 26. A first acute angle between the axis $XG_1$—$XG_1$ of the grinding wheel 26 and the basic axis $XC_1$—$XC_1$ may be represented as follows;

$$iV = \theta V + \theta VG$$

where $\theta VG$ is the pressure angle of the grinding wheel 26 and $\theta V$ is that of the cutter 20.

Figure 2:
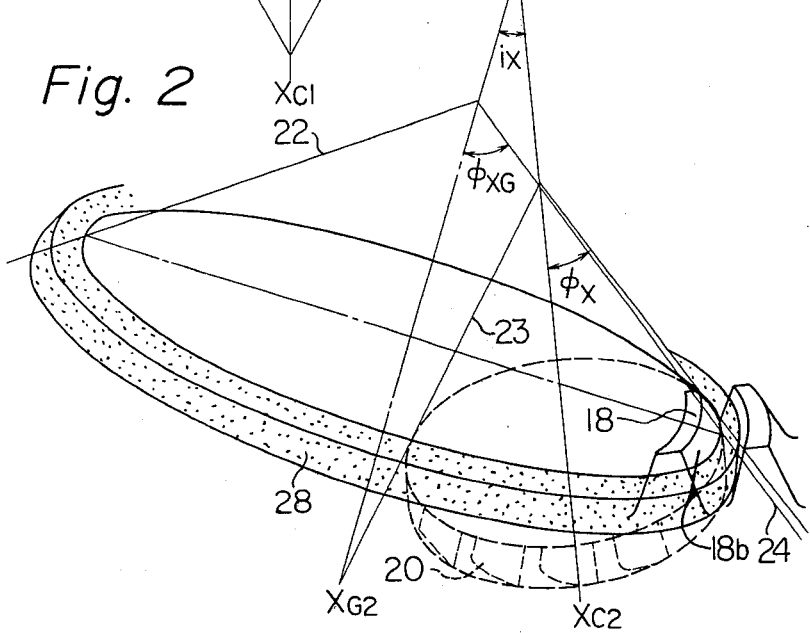
FIG. 2 is similar to FIG. 1 and shows another dished grinding wheel grinding a convex side surface of a gear tooth.

In FIG. 2 a convex tooth surface 18b of the tooth 18 of the spiral bevel gear is being ground by a large grinding wheel 28. A second acute angle iX between the basic axis $XC_2$—$XC_2$ and the axis $XG_2$—$XG_2$ of the grinding wheel 28 may be represented by the following equation.

$$iX = \phi XG - \phi X,$$

where, $\phi X$ is the pressure angle of the other face of the annular face milling cutter 20 here defined by a cone 23, and $\phi XG$ is the pressure angle of a cone 22 defining the grinding wheel 28. A common line 24 lies on the surfaces of the cutter 20 and wheel 28.

Referring to FIGS. 1 and 2, in order to obtain the same operating profiles from the grinding wheels 26 and 28 defined by the cones 12, 22 and the cutter 20, it is essential that the grinding wheels 26 and 28 be rotated on their axes $XG_1$—$XG_1$ and $XG_2$—$XG_2$, respectively, and simultaneously moved in first and second longitudinally curved paths about the basic axes $XC_1$—$XC_1$ and $XC_2$—$XC_2$ whereas the lines 14 and 24 sweep the surfaces 18a and 18b respectively.

Figure 3:
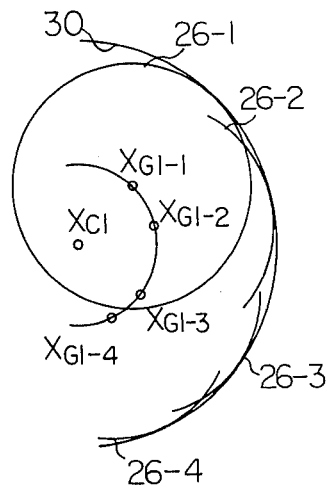
FIG. 3 is a graphical view in the pitch plane of a gear tooth whose concave side surface is being ground showing the locus of the grinding portion of the grinding wheel.
Figure 4:
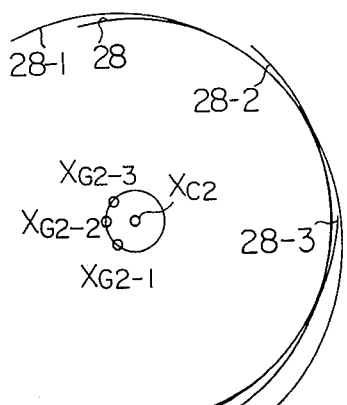
FIG. 4 is similar to FIG. 3, but shows a convex side tooth surface being ground.

FIGS. 3 and 4 show the grinding operation of a concave surface 18a and a convex surface 18b in the plane of the tooth 18 pitch surface. In FIG. 3, the locus of the intersection of the axis $XG_1$ of the grinding wheel 26 and the pitch surface of the tooth 18 is shown and designated as $XG_{1-1}$, $XG_{1-2}$, $XG_{1-3}$, . . . The external conic surface of the grinding wheel 26 in the pitch plane is circumferentially displaced as indicated by 26-1, 26-2, 26-3, . . . , thus defining a circular arc 30 concentric with the basic axis $XC_1$, which is the desired concave tooth surface 18a of the gear 18.

Referring now to FIG. 4, there is likewise shown the locus of the internal conic surface of the grinding wheel 28 designated as 28-1, 28-2, 28-3 and the intersection locus of the axis $XG_2$ which is designated as $XG_{2-1}$, $XG_{2-2}$, $XG_{2-3}$, . . . The internal conic surface of the grinding wheel 28 defines a circular arc 32 concentric with the basic axis $XC_2$, which is the desired convex tooth surface 18b. Consequently, for performing a grinding operation of a concave tooth surface 18a, the radius of the grinding wheel 26 is smaller than that of the concave tooth surface 18a, but the wheel 26 does not contact the adjacent surface 18b, and for a grinding operation of a convex tooth surface 18b, the grinding wheel 28 has a radius which is larger than that of the convex tooth surface 18b, but does not contact the adjacent concave tooth surface 18a. Thus, high efficiency and precision can be provided.

The invention provides a unique method of indexing the gear between grinding of adjacent teeth which allows the maximum radii of the wheels 26 and 28 to be respectively as small and large as possible. First and second indexing operations for concave and convex tooth surfaces respectively will be described below.

In order to attain this object, the wheel 26 or 28 may be displaced parallel to its axis, along its axis, and/or along or angularly relative to a line normal to the pitch surface, thus allowing complete disengagement of the wheel 26 or 28 from the gear for indexing.

Figure 5:
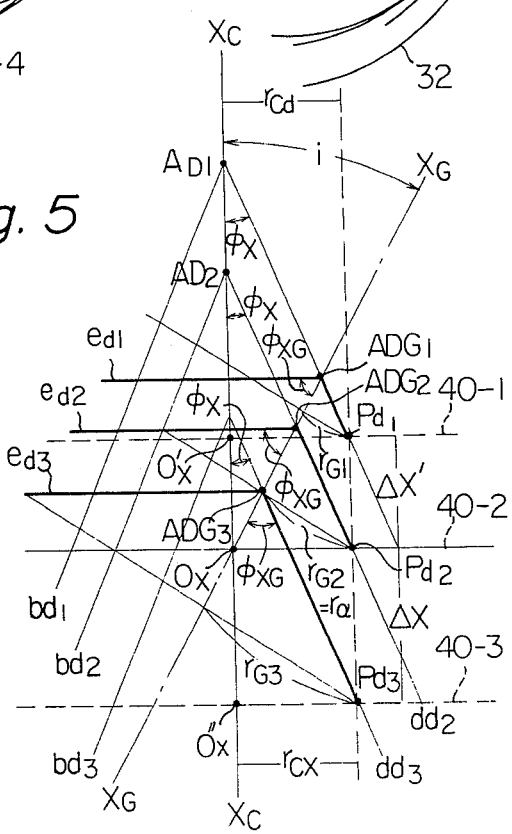
FIG. 5 is a graphical view of an indexing operation in which the grinding wheel is displaced along its own axis.

In FIG. 5, the grinding wheel 26 or 28 is displaced along its axis XG, to vary the size of the grinding wheel 26 or 28 without affecting a cutter 20 radius rCX. The grinding wheel axis $X_G$—$X_G$ intersects the basic axis $X_C$—$X_C$ at a point Ox at the angle i, and the upper shoulder of the grinding wheel attains positions $ADG_1$, $ADG_2$, $ADG_3$, . . . . With this arrangement, the cone distance of the grinding wheel at the apex-pitch point is $ADG_1$–$Pd_1$, $ADG_2$–$Pd_2$, $ADG_3$–$Pd_3$, . . . , while the radius of a cone extendedly defined by the grinding wheel (hereinafer referred to as the "grinding cone") is $rG_1$, $rG_2$, $rG_3$, . . . . Since the angle i is constant, the angle of the grinding cone does not change with such displacement, and consequently the pitch surface 40-1, 40-2, 40-3, . . . , but if the grinding cone is displaced axially, there is no obstacle to an indexing operation. Now, assume that the basic pitch is located at $Pd_2$, and that the location of the pitch is changed to $Pd_3$ to increase the diameter of the grinding wheel;

$$rG_3 = rG + \Delta X \sin i,$$

where, $\Delta X$ is a distance between $Pd_2$ and $Pd_3$, and $rG_2$ equals $rG$. Likewise, $$rG_1 = rG - \Delta X' \sin i,$$

where, $\Delta X'$ is a distance between $Pd_2$ and $Pd_1$.

Figure 6:
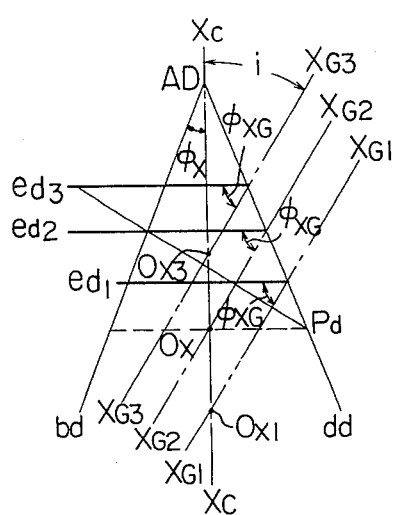
FIG. 6 is a graphical view of an indexing operation in which a grinding wheel is displaced parallel to its own axis.

In FIG. 6, the grinding wheel 26 or 28 is displaced parallel to its axis so that the point of intersection of the axes XC and XG assumes positions $Ox_1$ . . . , without affecting the position of the cone for forming the tooth surface. This method may also be arranged so that the wheel is also movable along the basic axis $X_C$—$X_C$.

Figure 7:
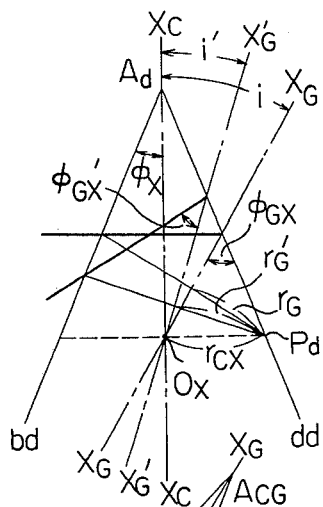
FIG. 7 is a graphical view of an indexing operation in which a grinding wheel for grinding a convex tooth side surface is angularly displaced relative to its axis.

In FIG. 7, a convex surface 18b is being ground, and the wheel 28 is being angularly displaced relative to its axis for indexing. The cutter 20 designated as bd-Ad-dd has a point of intersection Ox with the basic axis $X_C$—$X_C$ for forming the tooth surface 18b, and its axis XG-XG forms an angle i with the axis $X_C$—$X_C$. The radius rG of the grinding wheel at the point Pd is obtained from the following equation, $$rG' = rG \times \cos i',$$

where $i > i'$, $rG' > rG$.

Therefore, the smaller the angle i the larger the radius of grinding wheel.

Figure 8:
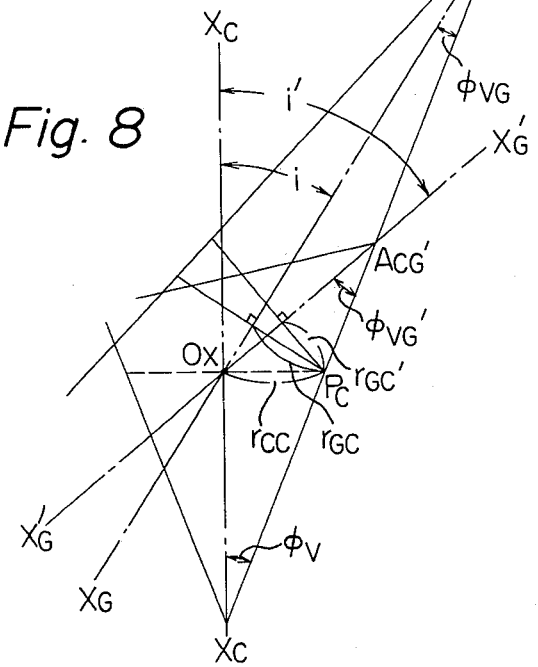
FIG. 8 is similar to FIG. 7 and shows an indexing operation for a concave tooth side surface.

In case of grinding a concave tooth surface 18a, as illustrated in FIG. 8, when the angle i is varied to $i''$, the radius of grinding wheel $rGC'$ at the pitch point Pc is obtained by the following equation, i.e.;

$$rGC' = rCC \cos i'',$$

where $i < i''$, $rGC' < rGC$

Therefore, the greater the angle i the smaller the radius of grinding wheel.

If the size of the grinding wheel is excessively increased, the opposite surface to the working surface of the grinding wheel will contact the side of a tooth adjacent to the working tooth, and, there is a limit to the size of the grinding wheel.

Figure 9:
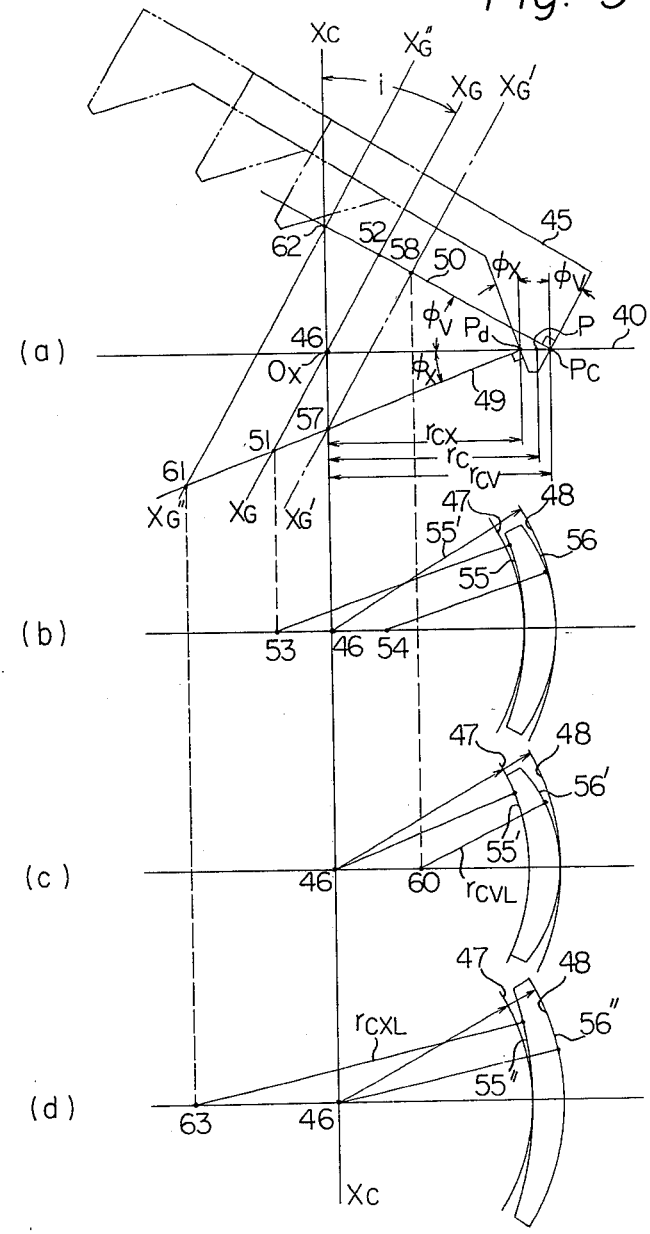
FIG. 9 is a graphical view of a prior art "spread blade" grinding method illustrating the advantages of the method of the present invention.

As a guide in consideration of the problem of interference of the grinding wheel with a tooth side of a gear if the gears are cut "spread blade," with the grinding wheel being movable parallel to its own axis, there is shown in FIG. 9 the relationship between the grinding wheel and the gear teeth, wherein P is a middle point between Pc and Pd, and $\overline{O_xP} = rC$, $\overline{PdPc} = Tp$.

Then, a radius of curvature rCX of a convex tooth surface in the plane of a pitch surface 40 is:

$$rCX = rC - Tp/2,$$

and a radius of curvature rCV of a concave tooth surface is likewise;

$$rCV = rC + Tp/2.$$

As the abovementioned radii of curvature rCX and rCV are of cone radii for forming the convex and concave tooth surfaces 18b and 18a, respectively, and when viewed in the plane of the pitch surface, a convex arc 47, a concave arc 48 and a median 46 can be seen.

If $X_G$—$X_G$ is the axis of the grinding wheel and intersects the basic axis $X_C$—$X_C$ in the plane of the pitch surface 40, and a point of intersection of the pitch surface 40 and the axis $X_G$—$X_G$ is $O_X$, points of intersection of each tooth surface with the pitch surface, i.e.; pitch point Pd, a point of intersection of normals 49 and 50 at Pc and the axis $X_G$—$X_G$; points 53 and 54 projected onto the pitch surface are now the centers of curvatures of surfaces 55 and 56 of the grinding wheel adapted to grind each tooth surface of the gear. The radius of curvature of the grinding wheel is greater than that of the convex tooth surface, and is smaller than that of the concave tooth surface. Thus, there will be sufficient clearance between the grinding wheel and adjacent gear teeth during grinding.

In case of grinding a concave tooth surface, for the reason stated above, it is desirable to make the curvature of the surface 56 of the grinding wheel as small as possible, without causing interference with a convex tooth surface. The resultant practical limit is that the arc 47 corresponds to a radius 55' in the plane of the pitch surface of the grinding wheel. Within this limit, if the axis of the grinding wheel is displaced parallel to its axis to a new position $X_{G''} - X_{G'}$, having a point of intersection 57 with the basic axis $X_C - X_C$ and the normal 49, a new point of intersection of the normal 50 with the axis of the grinding wheel $X_G - X_G$ is located at 58. In this instance, when considering projections of such points in the plane of the pitch surface, as illustrated in FIG. 9c, the curves 47 and 55' come to correspond with each other, and there is created a new tooth grinding surface 56' of a larger curvature with respect to the curve 48, a center of curvature which is now 60, and which is a theoretical minimum curvature of the tooth grinding surface 55'. In other words, a smaller curvature of the tooth surface 56' would cause interference with the arc 47.

Likewise, when moving the axis of the grinding wheel in parallel having a point of intersection 62 with the normal 50 and the basic axis $X_C - X_C$, a new point of intersection of the normal 49 and the axis $X_G - X_G$ is now 61, and thus a new tooth grinding surface 56'' coinciding with the concave tooth arc 48 is formed. For the convex tooth arc 47, there is provided a new corresponding grinding surface 55' having a larger radius of curvature and being concentric with a projection 63 of the point of intersection 61. A theoretical maximum curvature of the tooth grinding surface 55'' would cause interference with the tooth arc 48.

If the radius of the grinding surface 56' is rCVL, and the radius of the grinding surface 55'' is rCXL, where $\phi V < 0$, the following equations are obtained;

$$rCVL = (rCV - rCX \tan \phi X \tan i) \cos i \cdot \cos \phi V / \cos (\phi V + i)$$

...(1)

$$rCXL = (rCX - rCV \tan \phi V \tan i) \cos i \cdot \cos \phi X / \cos(\phi X + i)$$

...(2)

When a gear is ground "spread blade," and the angle of the grinding wheel is increased, the radius of curvature of the grinding surface of the grinding wheel for a convex tooth surface increases, while the radius of curvature of the grinding wheel surface for a concave tooth surface decreases in contrast. But at the same time, with this decrease on the part of a concave tooth surface, there is a tendency that the radius of the grinding wheel also decreases, and the angle of the grinding wheel must be determined in consideration thereof.

In general, if a bevel gear of equal tooth height is ground and both tooth surfaces are finished simultaneously, an unbalance in the tooth thickness at the root and top portions thereof is likely to occur. It is preferably in grinding operations in which the radius of the tooth forming cone is relatively large to separately finish grinding adjacent tooth surfaces so as to achieve a good balance in the tooth thickness.

When performing a grinding operation on a gear in the above described manner, two grinding wheel axes are required for grinding each of the tooth side surfaces, and also two basic axes for each tooth surface.

Figure 10:
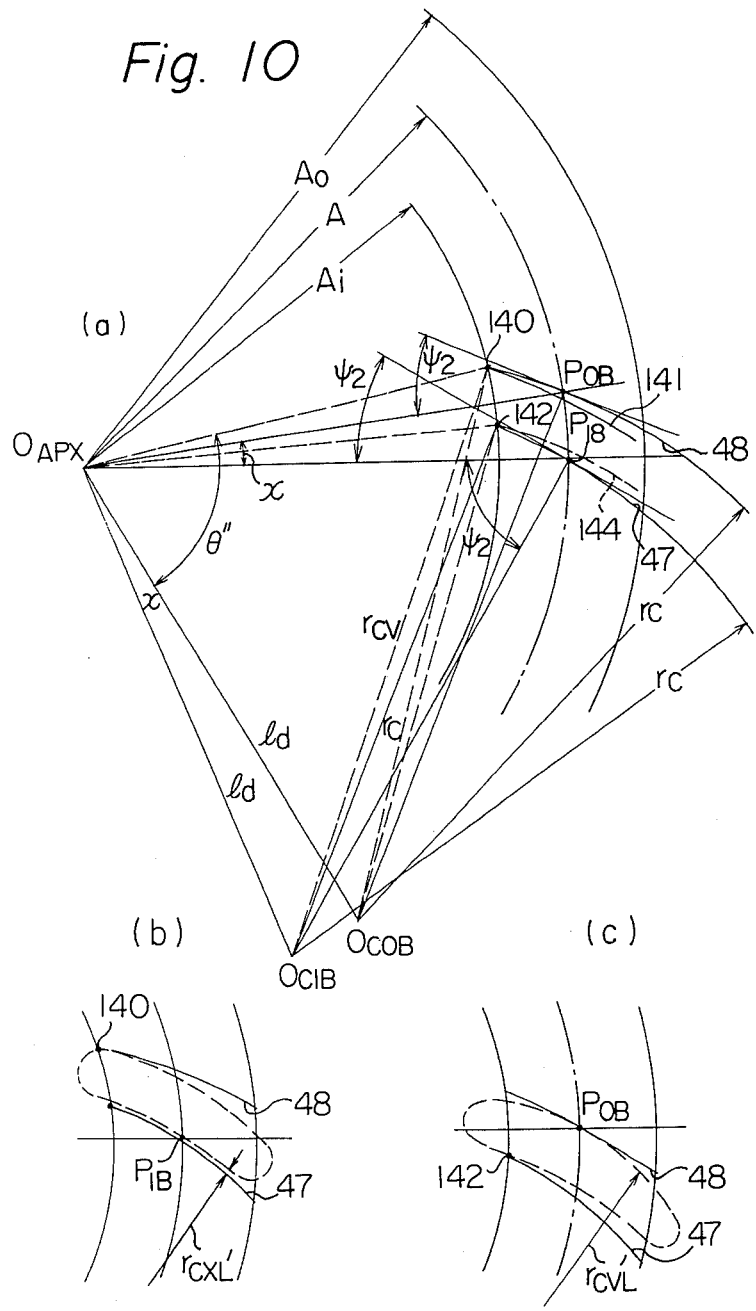
FIG. 10 is similar to FIG. 9 and shows the geometry of a grinding wheel and a tooth space during a single pass of the wheel.

FIGS. 10(a), (b), and (c) show a spiral bevel gear in a given pitch surface plane, in which a basic axis OCIB for forming the convex tooth arc 47 and a basic axis OCOB for forming the concave tooth arc 48 are provided. The helix angles of each tooth surface at an average distance A are $\Psi_2$, and since they must be the same, it is essential in the course of grinding of the tooth arcs 47 and 48 to prevent interference from occurring with an adjacent tooth surface. When sweeping the tooth arc 47, a theoretical limit is met when a circular arc 141 concentric with the center OCIB passing through a minor end point 140 of the tooth arc 48 coincides with the external circumference of the grinding wheel. If a distance from the center OCIB to the minor end point 140 is designated as $rCV'$, a distance ld from the apex of a cone OApX to the basic axis OCIB is represented by the following equation:

$$OApX - OCIB = (A^2 + rC^2 - 2A \, r \, C \cos\Psi_2)^{1/2} = ld,$$

where, $\angle OCIB \cdot OApX \cdot OCOB = \angle P'B \cdot OApX \cdot OOB = X$. Thus, the value X may be determined in the design of the tooth profile of the gear.

In a triangle $\triangle OApX \cdot OCOB \cdot 140$, if $\angle 140 \cdot OApX \cdot OCOB$ is $\theta''$, $$\theta'' = \cos^{-1}\{(Ai^2 + ld^2 - rC^2)/2Aild\}.$$

Therefore, $$rCV' = \{Ai^2 + ld^2 - 2Aild \cos(\theta'' + X)\}^{1/2}.$$

Consequently, a limiting design radius $rCXL'$ for sweeping the tooth arc 47 is obtained by substituting into equation (1) as follows;

$$rCXL' = (rC - rCV' \cdot \tan \phi V \cdot \tan i) \cos i \cdot \cos \phi X / \cos(oX + i).$$

And, likewise, in a triangle $\triangle OApX \cdot OCIB \cdot 142$, if $\angle 142, OApX \cdot OCIB$ is $\theta'$, $$\theta' = \cos^{-1}\{Ai^2 + ld^2 - rC^2/(2A + ld)\} = \theta''.$$

If $\overline{OCOB - 142}$ equals $rCX'$, $$rCX' = rCV'$$

Consequently, a limiting design radius $rCVL$ of the tooth arc 48 is obtained by substituting into equation (2), as follows;

$$rCVL' = (rC - rCV' \, x \cdot \tan \phi \, r \cdot \tan i) \cos i \cdot \cos \phi V / \cos(\phi V + i).$$

Thus, the internal circumference of the grinding wheel coincides with a circular arc 144.

As studied above geometrically, in the present method of grinding spiral bevel gears, different grinding wheel axes are used for the convex and concave tooth surfaces, and moreover, it is practically possible to select a limiting design radius which satisfies the above equations in accordance with the location and configuration of a grinding wheel. FIGS. 10(b) and (c) show the limiting relationship between the grinding wheel and the tooth arc of a gear.

According to the present method, no procedure such as relieving either the grinding wheel or gear is required during indexing as required in a conventional grinding machine using a dished grinding wheel. By simply swinging the grinding wheel about a given axis, indexing operations may be performed which totally dis-disengage the wheel from the gear without any other complex procedures.

Figure 11:
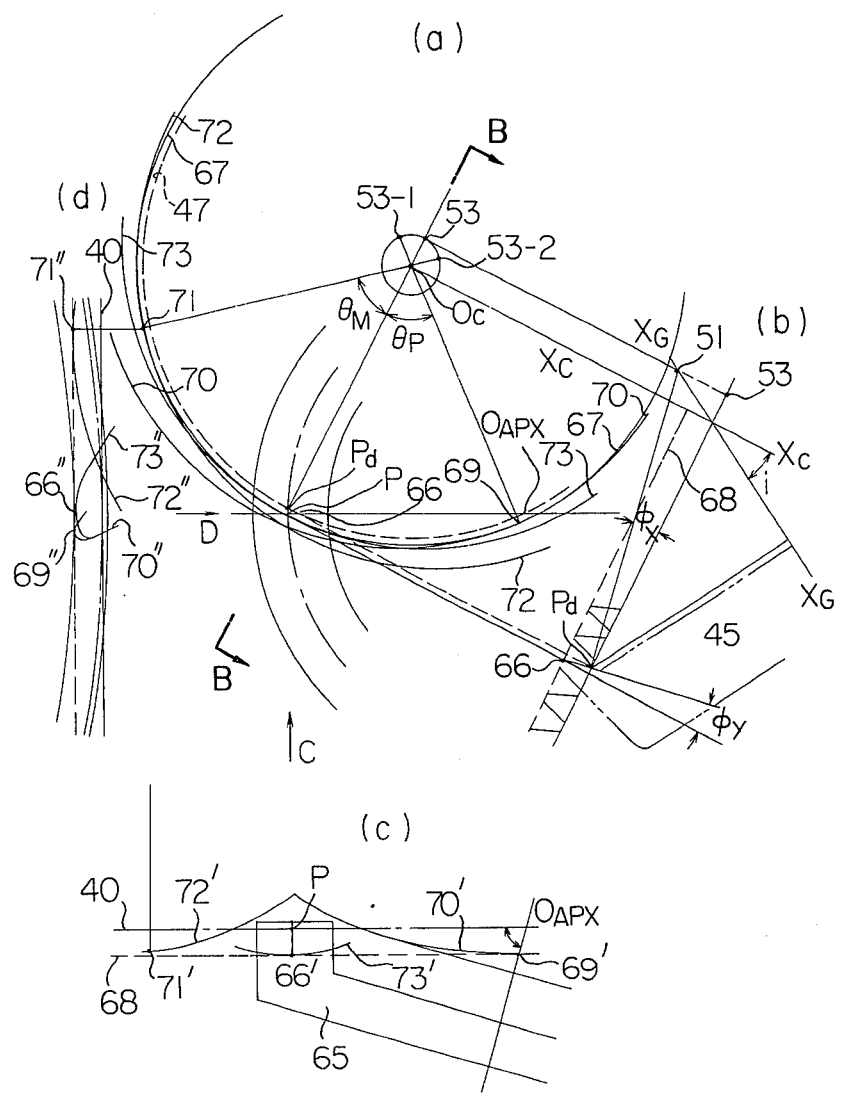
FIG. 11 is a graphical view of the extremes of a pass of the grinding wheel relevant to an indexing operation.

FIG. 11(a) shows the pitch surface 40 at the pitch point P. FIG. 11(b) is a fragmentary view taken in the direction of an arrow C in FIG. 11(a) showing the locus of the leading edge of the grind stone. The arc 47 is a convex tooth surface line of radius rCX, a point of intersection of a tooth top 68 parallel to the pitch surface 40 with a convex tooth surface is 66, and a circle 67 concentric with the arc 47 becomes a tooth top line in FIG. 11(a). When a grinding wheel 45 is rotated by $\theta p$ around a center C (the axis $X_C$—$X_C$), the leading edge of the grinding wheel reaches a point 69, the center of curvature of the grinding wheel is 47 and an edge circle is 72. On the other hand, when not rotating the grinding wheel, the edge circle is 73. As illustrated in FIG. 11(b), when the leading edge of the grinding wheel is rotated by a certain angle about the center $O_C$, it comes to a position where there is no interference with a tooth surface of a gear 65, and in this instance it is possible to index the gear 65 being ground. In this practice, the indexing procedure may be performed when a swinging motion reaches a major end portion ($\theta M$ in FIG. 11(a)) or a minor end portion $\theta p$, or at both points.

Figure 12:
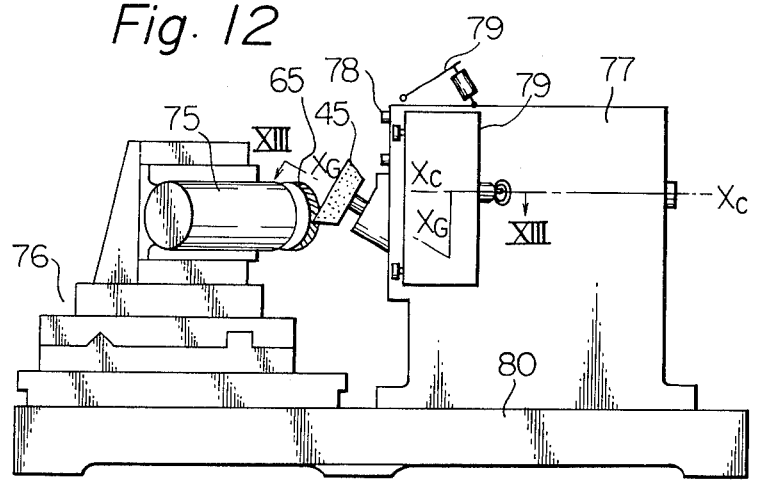
FIG. 12 is a front elevation view of a grinding machine adapted to embody the method according to the invention.

In FIGS. 12 through to 20, there are shown certain preferred embodiments of a grinding machine having a specific location mechanism applicable to grinding operations for spiral bevel gears which is designed to perform the grinding operations according to this invention.

Figure 13:
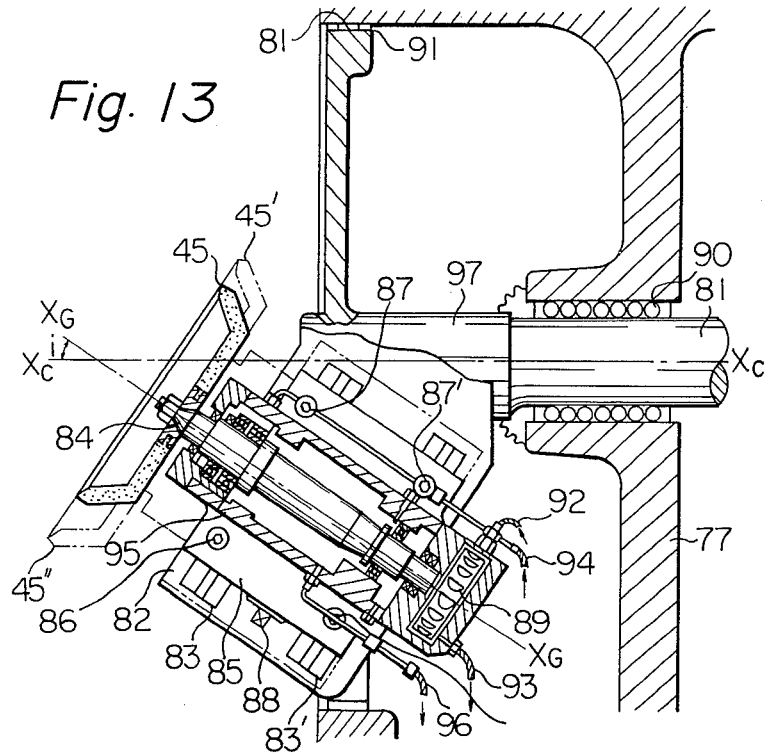
FIG. 13 is an elevation view, partly in section, of a locating mechanism of the machine of FIG. 12 which is adapted to displace the grinding wheel parallel to its axis.

In FIGS. 12 and 13, there is shown a first example of a grinding machine to grind a spiral bevel gear according to this invention. In this embodiment, the gear 65 is held in position on a work piece spindle 75, which is movable longitudinally, transversely and axially, and which is rigidly fixed on a base plate 76 designed to be freely rotatable. On the other hand, the grinding wheel 45 is rotatably mounted about the axis $X_G$—$X_G$, and may be moved as desired. A driving mechanism is disposed in a housing 77. In this arrangement, there is provided a limit switch 78, a safety cover 79, and a bed 80. For indexing the gear 65, the limit switch 78 is actuated in accordance with the swinging angle of the grinding wheel about the basic axis $X_C$—$X_C$, so as to operate the spindle 75 by means such as a magnetic valve, a hydraulic motor, an index plate, etc. As an alternative method, the indexing procedures may also be performed by relieving the work piece or the grinding wheel. In FIG. 13, there is shown an enlarged view of a locating mechanism for the grinding wheel 45, in which there is provided a base plate 82 at the leading end of a main shaft 81 which defines the basic axis $X_C$—$X_C$ at the angle i with respect to the axis of grinding wheel $X_G$—$X_G$. Slots 83 and 83' are provided for maintaining the axis of the grinding wheel 65 at the angle i. A housing 85 of a grinding wheel spindle 84 is held in position by bolts 86, 86', 87 and 87'. The housing 85 may be adjustably moved by an adjusting bolt 88, etc. The grinding wheel spindle 84 is driven by a hydraulic turbine 89. By such an arrangement, high rigidity in the suspension of the shafting of the grinding wheel 45 is made possible. The displacement system for the grinding wheel 45 corresponds to the method shown in FIG. 6, and possible positions of the wheel are shown as 45, 45' and 45'' in FIG. 13. The main shaft 81 is held so as to allow not only rotary motion, but also axial motion along the axis $X_C$—$X_C$ to allow dressing of the grinding wheel 45 by means of a linear ball bearing 90 or guide bearing 91 and a cutter shaft bed 97. A high pressure oil line 92, a turbine drain 93, an oil supply line 94 for the bearings, etc., a drain 96, and a grinding wheel shafting unit 95 are also shown.

Figure 14:
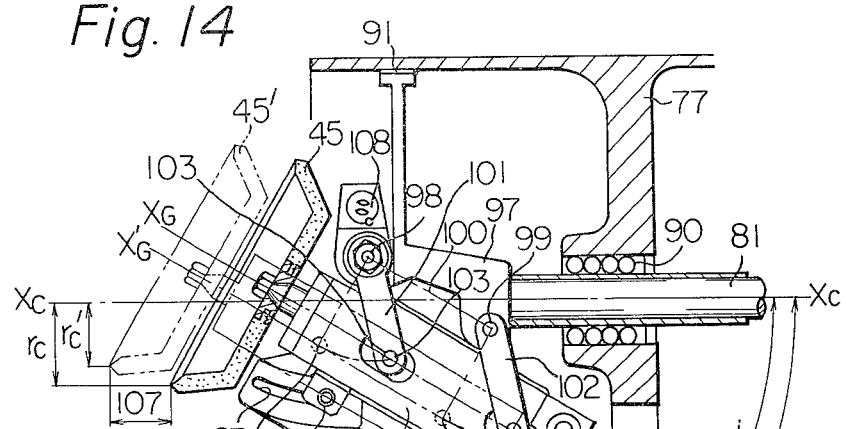
FIG. 14 is similar to FIG. 13 and shows a locating mechanism of a parallel motion type to displace the grinding wheel parallel to its axis.

FIG. 14 shows a second example of a grinding wheel locating mechanism which adapts the parallelogram principle to provide a precise angle of the grinding wheel axis with respect to the basic axis, which may advantageously save space in a radial direction, especially that of the guide bearing 91, thus substantially contributing to a compact design.

In this arrangement, there are rotatably provided two links 101 and 102 of equal length on pivot pins 98 and 99 on the cutter shaft bed 97. These two links 101 and 102 are positioned on a straight line 100 connecting the pivot pins 98 and 99 in parallel with the grinding wheel center axis $X_G$—$X_G$. Pivot points 103 and 104 connect the other ends of the links 101 and 102 to points on the grinding wheel shafting unit 95, thus defining a parallelogram 98–99–103–104. When the pivot pin 98 is rotated by operating, for instance, a hand wheel 108 adapted to actuate a worm and wheel mechanism, the links 101 and 102 are caused to swing. The pivot points 103 and 104 are thus swingably moved to phantom positions 105 and 106, respectively. Since the four pins form a parallelogram, the central axis $X_G$—$X_G$ of the grinding wheel takes a new position as designated by $X_{G'}$—$X_{G'}$ by parallel motion, whereby the grinding cone radius rC shifts to rC', and there occurs a displacement 107 of the axis of the grinding wheel 45. In order to prevent interference of the grinding wheel 45 with the gear 65 due to this displacement, it is possible to perform an adjustment by retracting the main shaft 81 which defines the basic axis $X_C$—$X_C$ with respect to the housing 77. After the grinding wheel shafting unit 95 is properly located in position as described above, it is secured in the slots 83 and 83' of the base plate 82, which is rigidly fixed to the bed 97, by suitable means such as the bolts 86 and 87. Each of the pivot pins 98, 99, 103, 104 of the links 101 and 102 is also secured using conventionally known means.

Figure 15:
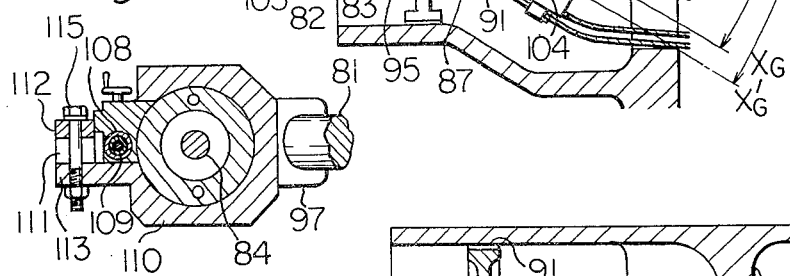
FIG. 15 is similar to FIG. 13 and shows another locating mechanism to displace the grinding wheel along its axis.

In FIG. 15, there is shown a third example of a locating mechanism which embodies the design principle shown in FIG. 5. The grinding wheel shafting unit 95 is designed to slidably move along the grinding wheel axis $X_G$—$X_G$ using a suitable means as the hand wheel 108, a screw 109, and a rack and pinion mechanism or the like, whereby the grinding cone radius is caused to shift from rC to rC'. In this arrangement, similar to the example shown in FIG. 14, the grinding wheel 45 is operable to move by the displacement 107 in the direction of the basic axis $X_C$—$X_C$, and consequently, there is provided an adjustment in the direction of the grinding wheel axis. When necessary, the main shaft 81 is retracted with respect to the housing 77.

Figure 16:
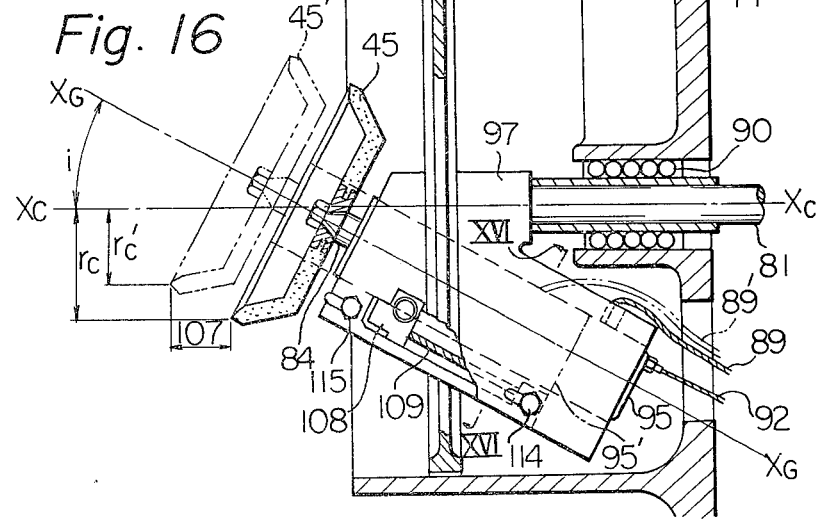
FIG. 16 is a section on a line XVI—XVI of FIG. 15.

FIG. 16 is taken on a line XVI—XVI in FIG. 15, wherein the grinding wheel shafting unit 95 is slidably moved in the direction of the axis $X_G$—$X_G$ by means of the hand wheel 108 and screw 109 which is slidably and loosely fitted in a casing 110 in the bed 97 in the grinding wheel shafting unit 95. The unit 95 may be rigidly secured in position by means of bolts 114 and 115 which are installed between flanges 111, 112 and 113.

Figure 17:
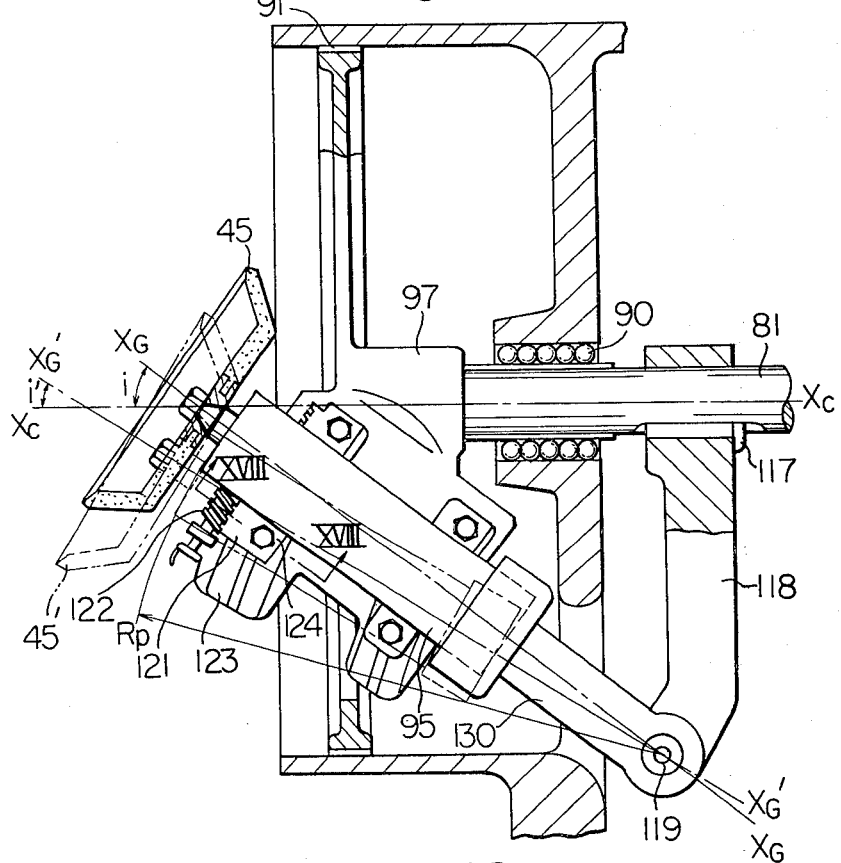
FIG. 17 shows a locating mechanism to displace the grinding wheel angularly with respect to its axis.
Figure 18:
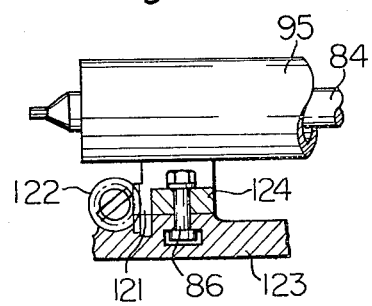
FIG. 18 is a partial sectional view on a line XVIII—XVIII of FIG. 17.

FIG. 17 shows a fourth example of a locating mechanism wherein the grinding wheel axis $X_G$—$X_G$ is angularly variable with respect to itself. In this arrangement, there is provided the unit 95 composed integrally with an arm 130 which swings on a pivot shaft 119 on a support 118 secured to the main shaft 81 by a key 117. The angle between the grinding wheel axis $X_G$—$X_G$ and the basic axis $X_C$—$X_C$ is caused to vary from $i$ to $i'$ by swinging the arm 130, and this angular displacement may be reduced to an extremely small value by selection of the length Rp of the arm 130. It is further possible to move the main shaft 81 in an axial direction. There are provided a sector gear 121 in the grinding wheel shafting unit 95, and a worm 122 which engages with the sector gear 121, and a base 123 which is integrally formed with the cutter shaft bed 97. By manually rotating the worm 122, there occurs angular displacement of the unit 95 to a position 95'. A flange 124 of the unit 95 may be secured to the base 123 by using the bolts 86 as illustrated in FIG. 18.

FIGS. 19 and 20 show another example of a locating mechanism for the grinding wheel shafting unit 95, wherein complex adjustment is provided to allow angular adjustment of the angle i of the grinding wheel axis $X_G$—$X_G$ with respect to the basic axis $X_C$—$X_C$, and simultaneously axial motion of the unit in the direction of the basic axis $X_C$—$X_C$. In this arrangement, there is provided a shaft 128 in a base 127 which is vertically shiftable as shown with respect to the basic axis $X_C$—$X_C$ by means of a tongue and groove assembly 200 located at an end portion 126 of a cutter shaft 125. The grinding wheel shafting unit 95 is rotatably installed on the shaft 128. There is a scale 129 on the base 127 so that the angle of the grinding wheel shafting unit 95 may be set.

The cutter shaft 125 is of hollow construction, and in the interior of the shaft 125 there is slidably inserted a shaft 131 having a tapered lower end 132. The upper end of the shaft 131 engages with a lever 133 which is swingably operated by an air cylinder 134 and a hand wheel 135. The lower end 132 of the shaft 131 engages with one end of a lever 137 which is swingable about an axis 136, while the other end 138 of the lever 137 engages with a land 150 of a nut 139. The nut 139 moves on a screw shaft 151 which is rotatably installed in the base 127. In operation, when actuating the air cylinder 134 or the hand wheel 135, the nut 139 is moved toward the right as viewed in FIG. 19 by the lever 133, the shaft 131, and the lever 137, and causes the screw shaft 151 to rotate, thus providing fine adjustment of the grinding wheel 45. As an auxiliary means applicable in the event that there occurs no rotation of the screw shaft 151 as described above due to too small lead of the shaft 151, it is possible to make the screw shaft 151 rotate by a worm gear 157 fixed thereon through gear trains 152, 153 and 154, and a spline connection 155 from the hand wheel 135. The accuracy of setting the grinding wheel 45 in the axial direction depends on the taper of the lower tapered end 132 of the shaft 131.

As fully described hereinbefore, this invention provides an improved method of grinding spiral bevel gears and hypoid gears advantageously to allow grinding operations to be separately performed on concave and convex side tooth surfaces of gears, and the maximum radii of the wheels for grinding concave and convex tooth surfaces to be respectively as small and large as possible.

We claim:

1. A method of grinding the tooth surfaces of gears with circular teeth, comprising the steps of applying an internal grinding conic surface of a truncated cone shaped grinding wheel of cup-like hollow construction to a circular arc shaped, convexly curved tooth trace of the gear, said grinding wheel having a cone in which said grinding conic surface forms a part thereof, said tooth trace having a cone in which said tooth trace forms a part of a circle forming an intersection of said cone and a plane perpendicular to a central axis of said cone, said grinding wheel being disposed on a central axis of said cone thereof in inclined and intersecting relationship to said central axis of said cone of said tooth trace, said grinding wheel being disposed in such a manner that a generatrix of said cone thereof always coincides with a generatrix of said cone of said tooth trace, said grinding conic surface having a radius of curvature which makes a maximum difference between said radius of curvature and a radius of curvature of said tooth trace within a range in which there occurs no geometrical interference of an external surface of said grinding wheel with a concavely curved tooth trace located opposedly adjacent to said convexly curved tooth trace to be ground, rotating said grinding wheel around said central axis of said cone thereof for grinding of said tooth trace, revolving said grinding wheel around said central axis of said cone of said tooth trace for grinding thereof.

2. A method as claimed in claim 1, further comprising the steps of applying an external grinding conic surface of a truncated cone shaped second grinding wheel of cup-like hollow construction to a circular arc shaped, concavely curved tooth trace of the gear, said second grinding wheel having a cone in which said external grinding conic surface forms a part thereof, said concavely curved tooth trace having a cone in which said concavely curved tooth trace forms a part of a circle forming an intersection of said cone and a plane perpendicular to a central axis of said cone, said second grinding wheel being disposed on a central axis of said cone thereof in inclined and intersecting relationship to said central axis of said cone of said concavely curved tooth trace, said second grinding wheel being disposed in such a manner that a generatrix of said cone thereof always concides with a generatrix of said cone of said concavely curved tooth trace, said external grinding conic surface having a radius of curvature which makes a maximum difference between said radius of curvature and a radius of curvature of said concavely curved tooth trace within a range in which there occurs no geometrical interference of an internal surface of said second grinding wheel with a convexly curved tooth trace located opposedly adjacent to said concavely curved tooth trace to be ground, rotating said second grinding wheel around said central axis of said cone thereof for grinding of said concavely curved tooth trace, revolving said second grinding wheel around said central axis of said concavely curved tooth trace for grinding thereof.

3. A method as claimed in claim 2, in which said second grinding wheel is displaceable on said central axis of and in the direction of said central axis of said cone thereof to enable said second grinding wheel to have an external grinding conic surface having a radius of curvature which makes said maximum difference.

4. A method as claimed in claim 2, in which said second grinding wheel is displaceable parallel to said central axis of said cone thereof to enable said second grinding wheel to have an external grinding conic surface having a radius of curvature which makes said maximum difference.

5. A method as claimed in claim 2, in which variable is an angle of inclination of said central axis of said cone of said second grinding wheel with said central axis of said cone of said concavely curved tooth trace to enable said second grinding wheel to have an external grinding conic surface having a radius of curvature which makes said maximum difference.

6. A method as claimed in claim 5, in which said grinding wheel is displaceable on said central axis of and in the direction of said central axis of said cone thereof to enable said grinding wheel to have an internal grinding conic surface having a radius of curvature which makes said maximum difference.

7. A method as claimed in claim 5, in which said grinding wheel is displaceable parallel to said cone thereof to enable said grinding wheel to have an internal grinding conic surface having a radius of curvature which makes said maximum difference.

8. A method as claimed in claim 1, in which variable is an angle of inclination of said central axis of said cone of said grinding wheel with said central axis of said cone of said tooth trace to enable said grinding wheel to have an internal grinding conic surface having a radius of curvature which makes said maximum difference.

* * * * *